US007867672B2

(12) United States Patent
Iftime et al.

(10) Patent No.: US 7,867,672 B2
(45) Date of Patent: Jan. 11, 2011

(54) REIMAGEABLE PAPER PROTECTED AGAINST UV LIGHT

(75) Inventors: Gabriel Iftime, Mississauga (CA); Hadi K. Mahabadi, Mississauga (CA); Peter M. Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 682 days.

(21) Appl. No.: 11/762,152

(22) Filed: Jun. 13, 2007

(65) Prior Publication Data

US 2008/0311496 A1 Dec. 18, 2008

(51) Int. Cl.
*C09K 19/00* (2006.01)
*G02F 1/03* (2006.01)
*G03C 11/00* (2006.01)
*G03C 1/76* (2006.01)
*G03C 1/725* (2006.01)

(52) U.S. Cl. ............................ 430/20; 430/19; 430/55; 430/66; 430/132; 430/269; 430/270.1; 430/281.1; 430/286.1

(58) Field of Classification Search ................ 430/269, 430/270.1, 281.1, 286.1, 55, 66, 132, 19.2
See application file for complete search history.

(56) References Cited

U.S. PATENT DOCUMENTS

| | | | | |
|---|---|---|---|---|
| 3,825,427 | A | 7/1974 | Inoue et al. | |
| 3,877,941 | A | 4/1975 | Lohmann | |
| 3,961,948 | A | 6/1976 | Saeva | |
| 4,425,161 | A | 1/1984 | Shibahashi et al. | |
| 4,598,035 | A | 7/1986 | Usami et al. | |
| 4,659,649 | A | 4/1987 | Dickinson et al. | |
| 4,931,337 | A | 6/1990 | Miyazaki et al. | |
| 5,124,236 | A | 6/1992 | Yamaguchi et al. | |
| 5,262,280 | A | 11/1993 | Knudsen et al. | |
| 5,376,511 | A | 12/1994 | Tatezono et al. | |
| 5,458,874 | A | 10/1995 | Pereira et al. | |
| 5,677,107 | A | 10/1997 | Neckers | |
| 5,691,100 | A | 11/1997 | Kudo et al. | |
| 5,691,395 | A | 11/1997 | Knudsen et al. | |
| 5,710,420 | A | 1/1998 | Martin et al. | |
| 5,747,225 | A | 5/1998 | Manico et al. | |
| 6,103,378 | A | 8/2000 | Yao et al. | |
| 6,200,646 | B1 | 3/2001 | Neckers et al. | |
| 6,528,221 | B2 | 3/2003 | Takezawa et al. | |
| 6,579,662 | B1 | 6/2003 | Zheng et al. | |
| 6,680,281 | B2 | 1/2004 | Tajiri et al. | |
| 6,761,758 | B2 | 7/2004 | Boils-Boissier et al. | |
| 6,866,981 | B2 | 3/2005 | Furukawa et al. | |
| 6,867,408 | B1 | 3/2005 | Gu et al. | |
| 6,906,118 | B2 | 6/2005 | Goodbrand et al. | |
| 7,018,714 | B2 | 3/2006 | Kobayashi et al. | |
| 7,057,054 | B2 | 6/2006 | Irie | |
| 7,195,802 | B2 * | 3/2007 | Iftime et al. | 428/1.3 |
| 7,205,088 | B2 | 4/2007 | Iftime et al. | |
| 7,214,456 | B2 | 5/2007 | Iftime et al. | |
| 7,229,740 | B2 * | 6/2007 | Iftime et al. | 430/270.1 |
| 7,256,921 | B2 | 8/2007 | Kumar et al. | |
| 7,332,257 | B2 | 2/2008 | Miyako et al. | |
| 7,381,506 | B2 | 6/2008 | Iftime et al. | |
| 7,441,887 | B2 | 10/2008 | Senga et al. | |
| 2002/0160318 | A1 | 10/2002 | Richter et al. | |
| 2003/0130456 | A1 | 7/2003 | Kim et al. | |
| 2005/0012998 | A1 | 1/2005 | Kumar et al. | |
| 2005/0244744 | A1 | 11/2005 | Kazmaier et al. | |
| 2005/0269556 | A1 | 12/2005 | Evans et al. | |
| 2006/0001944 | A1 | 1/2006 | Chopra et al. | |
| 2006/0222972 | A1 | 10/2006 | Chopra et al. | |
| 2006/0222973 | A1 | 10/2006 | Iftime et al. | |
| 2006/0236470 | A1 | 10/2006 | Sabnis et al. | |
| 2006/0251988 | A1 | 11/2006 | Iftime et al. | |

(Continued)

FOREIGN PATENT DOCUMENTS

| | | | |
|---|---|---|---|
| CA | 2 053 094 | A1 | 4/1992 |
| DE | 29 06 193 | A1 | 8/1980 |
| EP | 1 367 111 | | 12/2003 |
| EP | 1 405 891 | | 4/2004 |
| EP | 1 591 829 | | 11/2005 |
| EP | 1 591 831 | | 11/2005 |
| FR | 2774998 | | 8/1999 |
| GB | 2 430 257 | | 3/2007 |
| JP | 57-136645 | | 8/1982 |
| JP | A-61-175087 | | 8/1986 |

(Continued)

OTHER PUBLICATIONS

Wojtyk et al., "Effects of metal ion complexation on the spiropyran-merocyanine interconversion: development of a thermally stable photo-switch," J. Chem. Soc. Chem, Comm., pp. 1703-1704, 1998.
U.S. Appl. No. 11/762,152, filed Jun. 13, 2007, to Iftime et al.
U.S. Appl. No. 11/762,327, filed Jun. 13, 2007, to Iftime et al.
U.S. Appl. No. 11/762,147, filed Jun. 13, 2007, to Iftime et al.
U.S. Appl. No. 11/762,098, filed Jun. 13, 2007, to Iftime et al.
U.S. Appl. No. 11/762,157, filed Jun. 13, 2007, to Iftime et al.
U.S. Appl. No. 11/762,153, filed Jun. 13, 2007, to Iftime et al.
U.S. Appl. No. 11/762,144, filed Jun. 13, 2007, to Kazmaier et al.

(Continued)

*Primary Examiner*—Geraldina Visconti
(74) *Attorney, Agent, or Firm*—Oliff & Berridge, PLC

(57) ABSTRACT

An image forming medium includes a substrate; an imaging layer including an imaging material coated on said substrate, wherein the imaging material exhibits a reversible transition between a colorless state and a colored state; and a protective layer over the imaging layer, the protection layer including dipolar molecules that can be reversibly switch between a UV light transmission state and a UV light absorption state, wherein the dipolar molecules in their random orientation absorb in substantially the same spectral region as the imaging material in its un-imaged state, and wherein the imaging layer is imageable by ultraviolet light when the dipolar molecules are in the UV light transmission state, but the imaging layer is substantially not imageable by ultraviolet light when the dipolar molecules are in the UV light absorption state.

15 Claims, 4 Drawing Sheets

U.S. PATENT DOCUMENTS

| | | | | |
|---|---|---|---|---|
| 2006/0257785 | A1 | 11/2006 | Johnson | |
| 2007/0054215 | A1 | 3/2007 | Iftime et al. | |
| 2007/0072110 | A1 | 3/2007 | Iftime et al. | |
| 2007/0112103 | A1 | 5/2007 | Zhou et al. | |
| 2008/0311489 | A1* | 12/2008 | Kazmaier et al. | 430/19 |
| 2008/0311490 | A1* | 12/2008 | Norsten et al. | 430/19 |
| 2008/0311491 | A1* | 12/2008 | Iftime et al. | 430/19 |
| 2008/0311492 | A1* | 12/2008 | Iftime et al. | 430/19 |
| 2008/0311493 | A1* | 12/2008 | Norsten et al. | 430/19 |
| 2008/0311494 | A1* | 12/2008 | Norsten et al. | 430/19 |
| 2008/0311495 | A1* | 12/2008 | Norsten et al. | 430/19 |
| 2008/0311519 | A1* | 12/2008 | Kazmaier et al. | 430/286.1 |
| 2008/0311521 | A1* | 12/2008 | Kazmaier et al. | 430/286.1 |

FOREIGN PATENT DOCUMENTS

| | | |
|---|---|---|
| JP | A-5-265129 | 10/1993 |
| JP | A-11-30835 | 2/1999 |
| JP | A 11-322739 | 11/1999 |
| JP | A 2000-256347 | 9/2000 |
| JP | A-2002-179672 | 6/2002 |
| JP | A-2002-240441 | 8/2002 |
| JP | A-2002-285146 | 10/2002 |
| JP | A-2003-255489 | 9/2003 |
| JP | A-2003-255490 | 9/2003 |
| JP | A-2004-039009 | 2/2004 |
| JP | A-2004-045037 | 2/2004 |
| JP | A-2004-091638 | 3/2004 |
| JP | A-2004-149501 | 5/2004 |
| JP | A-2004-256780 | 9/2004 |
| JP | A-2005-082507 | 3/2005 |
| JP | A-2005-250463 | 9/2005 |
| WO | WO 97/31033 | 8/1997 |
| WO | WO 00/16985 A1 | 3/2000 |
| WO | WO 2006/039130 A1 | 4/2006 |
| WO | WO 2007/105699 A1 | 9/2007 |
| WO | WO 2008/043853 A2 | 4/2008 |

OTHER PUBLICATIONS

U.S. Appl. No. 11/762,150, filed Jun. 13, 2007, to Norsten et al.
U.S. Appl. No. 11/762,107, filed Jun. 13, 2007, to Iftime et al.
U.S. Appl. No. 11/762,176, filed Jun. 13, 2007, to Norsten et al.
U.S. Appl. No. 11/762,307, filed Jun. 13, 2007, to Norsten et al.
U.S. Appl. No. 11/762,159, filed Jun. 13, 2007, to Kazmaier et al.
U.S. Appl. No. 11/762,311, filed Jun. 13, 2007, to Kazmaier et al.
M. Irie, "Diarylethense for Memories and Switches," Chem Reviews, 100, pp. 1685-1716 (2000).
Kentaro Morimitsu et al., "Dithienylethenes With a Novel Photochromic Performance," J. Org. Chem., vol. 67, pp. 4574-4578 (2002).
"Dolch Introduces World's First Ruggedized Notebook with Integrated Printer" available at http://news.thomasnet.com/fullstory/7005/447, pp. 1-4, Feb. 6, 2002.
Masamitsu Shirai et al., "Photoacid and Photobase Generators: Chemistry and Applications to Polymeric Materials," *Prog. Polym. Sci*. vol. 21, pp. 1-45 (1996).
T. Hirose et al., "Self-Assembly of Photochromic Diarylethenes With Amphiphilic Side Chains: Reversible Thermal and Photochemical Control," J. Org. Chem., 71, pp. 7499-7508 (2006).
T. Norsten et al., "Photoregulation of Fluorescence in a Porphyrinic Dithienylethene Photochrome," J. Am. Chem. Soc., 123(8), pp. 1784-1785 (2001).
Vladimir I. Minkin, "Photo-, Thermo-, Solvato-, and Electrochromic Spiroheterocyclic Compounds," Chemical Reviews, 104, 5, pp. 2751-2776 (2004).
Takayuki Suzuki et al., "Stabilization of the merocyanine form of photochromic compounds in fluoro alcohols is due to a hydrogen bond", Chem. Commun., 2685-2686 (1998).
Ronald F.M. Lange et al., "Supramolecular polymer interactions based on the alternating copolymer of styrene and Maleimide" Macromolecules, 28, 782-783 (1995).
Vladimir I. Minkin et al., "Perimidine spirocyclohexa dienones" in Organic Photochromic and Thermochromic Compounds, V1, Plenum Press, pp. 315-340 (1999).
John Biteau et al., "Photochromism of Spirooxazine-Doped Gels," J. Phys. Chem., 100, 9024-9031 (1996).
Leonard J. Prins et al., "Noncovalent Synthesis Using Hydrogen Bonding," Angew. Chem. Int. Ed., 40, 2382-2426 (2001).
Terry M. Cresp et al., "A Synthesis of αβ-Unsaturated Aldehydes," J. Chem. Soc., Perkin Trans., 1, pp. 37-41 (1974).
Elliot Berman et al., "Photochromic Spiropyrans. I. The Effect of Substituents on the Rate of Ring Closure," J. Am. Chem. Soc., 81, 5605-5608 (1959).
Sheng-Hua Liu et al., "Synthesis of Negative Photochromic Crowned Spirobenzopyrans," Syn. Commun., 30, 5, 895-902 (2000).
Yu M. Chunaev et al., "Reaction of the Fischer Base With Nitro- and Bromo-Substituted αHydroxycinnamaldehydes," Chem. Heterocycl. Compd., 628-631 (1984).
Kentaro Morimitsu et al., "Thermal Cycloreversion Reaction of a Photochromic Dithienylperfluorocyclopentene with *tert* -Butoxy Substituents at the Reactive Carbons," The Chemical Society of Japan, 2002, p. 572-573.
O.M. Babeshko et al., "Spiro-2H-Oxocines", Khimiya Geterotsiklicheskikh Soedinenii, No. 11, pp. 1490-1492, Nov. 1976.
Samir Kumar Mandal et al., "Titanocene(III) mediated radical cyclizations of epoxides for the synthesis of medium-sized cyclic ethers", Tetrahedron, Vol. 63, pp. 11341-11348, 2007.
Sep. 9, 2009 European Office Action issued in European Application No. 08 155 983.3-1217.

* cited by examiner

REIMAGEABLE PAPER PROTECTED AGAINST UV LIGHT

TECHNICAL FIELD

This disclosure is generally directed to documents, and more specifically to reimageable paper, or reimageable transient documents or image forming media, and compositions and methods for making and using such reimageable paper. More particularly, in embodiments, this disclosure is directed to an image forming medium utilizing a composition that is imageable by UV light, such as comprising a photochromic compound dispersed in a polymer binder, where the composition exhibits a reversible transition between a colored and a clear state. To protect the imaged document against UV light, such as ambient light or sun light, the image forming medium further comprises a protective layer over the imaging layer, the protective layer comprising a dipolar molecule that can be reversibly switched between a UV light transmission state and a UV light absorption state such as by an applied electric field. As a result, the transient document is protected against undesired image degradation due to ambient UV light. In contrast, prior transient documents, such as paper using photochromic materials, exhibited image degradation when exposed to ambient light.

CROSS-REFERENCE TO RELATED APPLICATIONS

Disclosed in commonly assigned U.S. patent application Ser. No. 11/123,163, filed May 6, 2005, is an image forming medium, comprising a polymer, a photochromic compound containing chelating groups embedded in the polymer, and a metal salt, wherein molecules of the photochromic compound are chelated by a metal ion from the metal salt.

Disclosed in commonly assigned U.S. patent application Ser. No. 10/835,518, filed Apr. 29, 2004, is an image forming method comprising: (a) providing a reimageable medium comprised of a substrate and a photochromic material, wherein the medium is capable of exhibiting a color contrast and an absence of the color contrast; (b) exposing the medium to an imaging light corresponding to a predetermined image to result in an exposed region and a non-exposed region, wherein the color contrast is present between the exposed region and the non-exposed region to allow a temporary image corresponding to the predetermined image to be visible for a visible time; (c) subjecting the temporary image to an indoor ambient condition for an image erasing time to change the color contrast to the absence of the color contrast to erase the temporary image without using an image erasure device; and (d) optionally repeating procedures (b) and (c) a number of times to result in the medium undergoing a number of additional cycles of temporary image formation and temporary image erasure.

Disclosed in commonly assigned U.S. patent application Ser. No. 10/834,722, filed Apr. 29, 2004, is a reimageable medium comprising: a substrate; and a photochromic material, wherein the medium is capable of exhibiting a color contrast and an absence of the color contrast, wherein the medium has a characteristic that when the medium exhibits the absence of the color contrast and is then exposed to an imaging light corresponding to a predetermined image to result in an exposed region and a non-exposed region, the color contrast is present between the exposed region and the non-exposed region to form a temporary image corresponding to the predetermined image that is visible for a visible time, wherein the medium has a characteristic that when the temporary image is exposed to an indoor ambient condition for an image erasing time, the color contrast changes to the absence of the color contrast to erase the temporary image in all of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature, and wherein the medium is capable of undergoing multiple cycles of temporary image formation and temporary image erasure.

Disclosed in commonly assigned U.S. patent application Ser. No. 11/220,803, filed Sep. 8, 2005, is an image forming medium, comprising: a substrate; and an imaging layer comprising a photochromic material and a polymer binder coated on said substrate, wherein the photochromic material exhibits a reversible homogeneous-heterogeneous transition between a colorless state and a colored state in the polymer binder.

Disclosed in commonly assigned U.S. patent application Ser. No. 11/220,572, filed Sep. 8, 2005, is an image forming medium, comprising: a substrate; and a mixture comprising a photochromic material and a solvent wherein said mixture is coated on said substrate, wherein the photochromic material exhibits a reversible homogeneous-heterogeneous transition between a colorless state and a colored state in the solvent.

Disclosed in commonly assigned U.S. patent application Ser. No. 10/834,722, filed Apr. 29, 2004, is a reimageable medium comprising: a substrate; and a photochromic material, wherein the medium is capable of exhibiting a color contrast and an absence of the color contrast, wherein the medium has a characteristic that when the medium exhibits the absence of the color contrast and is then exposed to an imaging light corresponding to a predetermined image to result in an exposed region and a non-exposed region, the color contrast is present between the exposed region and the non-exposed region to form a temporary image corresponding to the predetermined image that is visible for a visible time, wherein the medium has a characteristic that when the temporary image is exposed to an indoor ambient condition for an image erasing time, the color contrast changes to the absence of the color contrast to erase the temporary image in all of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature, and wherein the medium is capable of undergoing multiple cycles of temporary image formation and temporary image erasure.

Disclosed in commonly assigned U.S. patent application Ser. No. 11/123,163, filed May 6, 2005, is an image forming medium, comprising a polymer; and a photochromic compound containing chelating groups embedded in the polymer; and a metal salt; wherein molecules of the photochromic compound are chelated by a metal ion from the metal salt.

Disclosed in commonly assigned U.S. patent application Ser. No. 11/093,993, filed Mar. 20, 2005, is a reimageable medium, comprising: a substrate having a first color; a photochromic layer adjacent to the substrate; a liquid crystal layer adjacent to the photochromic layer, wherein the liquid crystal layer includes a liquid crystal composition; and an electric field generating apparatus connected across the liquid crystal layer, wherein the electric field generating apparatus supplies a voltage across the liquid crystal layer.

Disclosed in commonly assigned U.S. patent application Ser. No. 10/834,529, filed Apr. 29, 2004, is a reimageable medium for receiving an imaging light having a predetermined wavelength scope, the medium comprising: a substrate; a photochromic material capable of reversibly converting among a number of different forms, wherein one form has an absorption spectrum that overlaps with the predetermined wavelength scope; and a light absorbing material exhibiting a light absorption band with an absorption peak, wherein the light absorption band overlaps with the absorption spectrum of the one form.

The entire disclosure of the above-mentioned applications are totally incorporated herein by reference.

BACKGROUND

Many paper documents are promptly discarded after being read. Although paper is inexpensive, the quantity of discarded paper documents is enormous and the disposal of these discarded paper documents raises significant cost and environmental issues. Accordingly, there is a continuing desire for providing a new medium for containing the desired image, and methods for preparing and using such a medium. In aspects thereof it would be desirable to be reusable, to abate the cost and environmental issues, and desirably also is flexible and paper-like to provide a medium that is customarily acceptable to end-users and easy to use and store.

Although there are available technologies for transient image formation and storage, they generally provide less than desirable results for most applications as a paper substitute. For example, alternative technologies include liquid crystal displays, electrophoretics, and gyricon image media. However, these alternative technologies may not in a number of instances provide a document that has the appearance and feel of traditional paper, while providing the desired reimageability.

Imaging techniques employing photochromic materials, that is materials which undergo reversible or irreversible photoinduced color changes are known, for example, U.S. Pat. No. 3,961,948 discloses an imaging method based upon visible light induced changes in a photochromic imaging layer containing a dispersion of at least one photochromic material in an organic film forming binder.

One type of composition that can be used for forming photochromic papers is disclosed in Buncel et al. (J. T. C. Wojtyk, P. M. Kazmaier, E. Buncel, *J. Chem. Soc. Chem. Comm,* 1703, (1998)). The composition exhibits life-times of at least two days for solutions in acetone of spiropyrans modified with chelating groups in the presence of metallic cations. The metal cation $M^{n+}$ can stabilize the open merocyanine form through chelation.

These and other photochromic (or reimageable or electric) papers are desirable because they can provide imaging media that can be reused many times, to transiently store images and documents. For example, applications for photochromic based media include reimageable documents such as, for example, electronic paper documents. Reimageable documents allow information to be kept for as long as the user wants, then the information can be erased or the reimageable document can be re-imaged using an imaging system with different information.

Although the above-described approaches have provided reimageable transient documents, there is a desire for reimageable paper designs that provide longer image life-times, and more desirable paper-like appearance and feel. For example, while the known approaches for photochromic paper provide transient visible images, the visible images are very susceptible to UV light, such as is present in both ambient interior light and more especially in sun light. Due to the presence of this UV light, the visible images are susceptible to degradation by the UV light, causing the unimaged areas to darken and thereby decrease the contrast between the desired image and the background or unimaged areas.

That is, a problem associated with transient documents is the sensitivity of the unimaged areas to ambient UV-VIS light (such as <420 nm) where the photochromic molecule absorbs. Unimaged areas become colored after a period of time, decreasing the visual quality of the document, because the contrast between white and colored state is reduced. One approach, described in the above-referenced U.S. patent application Ser. No. 10/834,529, is to stabilize the image against light of wavelength<420 nm by creating a band-pass window for the incident light capable of isomerising (i.e. inducing coloration) in the material, centered around 365 nm. However, the unimaged areas of the documents still are sensitive to UV-VIS light of wavelength centered around 365 nm.

SUMMARY

It is desirable for some uses that an image formed on a reimageable medium such as a transient document remains stable for extended time periods, without the image or image contrast being degraded by exposure to ambient UV light. Electronic paper documents should maintain a written image for as long as the user needs to view it, without the image being degraded by ambient light. The image may then be erased or replaced with a different image by the user on command. For electronic paper documents in applications that value viewability for more than several hours, the image should be stable for at least one or two days or beyond this.

The present disclosure addresses these and other needs, in embodiments, by providing an image forming medium utilizing a composition that is imageable by UV light, such as comprising a photochromic compound dispersed in a polymer binder, where the composition exhibits a reversible transition between a colored and a clear state. To protect the imaged document against UV light, such as ambient light or sun light, the image forming medium further comprises a protective layer over the image forming medium, the protective layer comprising a dipolar molecule that can be reversibly switched between a UV light transmission state and a UV light absorption state, such as by an applied electric field. The compositions and methods of the present disclosure provide transient images that are protected against undesired image degradation, such as reduced contrast by darkening of the background or non-imaged areas, due to ambient UV light. That is, the imaging layer is imageable by ultraviolet light when the dipolar molecules are in the UV light transmission state, but the imaging layer is not imageable, or substantially not imageable, by ultraviolet light when the dipolar molecules are in the UV light absorption state. In contrast, prior transient documents, such as paper using photochromic materials, exhibited image degradation when exposed to ambient light. The compositions and methods of the present disclosure also provide transient images that last for significantly longer periods of time, such as two days or more, before self-erase occurs.

This invention describes a method of protection of the unimaged areas of transient documents, protects the transient document against UV light from the entire UV spectrum, but allows writing, when needed. These documents may be usable even in the sun light. This was not possible with previous versions of transient documents, because the unwritten areas become immediately colored when exposed to sun light.

In an embodiment, the present disclosure provides an image forming medium, comprising a substrate;

an imaging layer comprising an imaging material coated on said substrate, wherein the imaging material exhibits a reversible transition between a colorless state and a colored state; and a protective layer over the imaging layer, the protective layer comprising dipolar molecules that can be reversibly switched between a UV light transmission state and a UV light absorption state, wherein the imaging layer is imageable by ultraviolet light when the dipolar molecules are in the UV light transmission state, but the imaging layer is substantially not imageable by ultraviolet light when the dipolar molecules are in the UV light absorption state.

In another embodiment, the present disclosure provides a method of forming a transient image, comprising:

providing an image forming medium comprising:

a substrate;

an imaging layer comprising an imaging material coated on said substrate, wherein the imaging material exhibits a reversible transition between a colorless state and a colored state; and a protective layer over the imaging layer, the protective layer comprising dipolar molecules that can be reversibly switched between a UV light transmission state and a UV light absorption state, wherein the imaging layer is imageable by ultraviolet light when the dipolar molecules are in the UV light transmission state, but the imaging layer is substantially not imageable by ultraviolet light when the dipolar molecules are in the UV light absorption state;

applying an electric field across said image forming medium to orient the dipolar molecules in the UV light transmission state;

exposing the image forming medium to a UV light in an imagewise manner; and removing the electric field from across said image forming medium to return the dipolar molecules in the UV light absorption state.

In another aspect, the present disclosure provides a method of making an image forming medium, comprising:

providing a substrate;

applying to the substrate an imaging layer comprising an imaging material, wherein the imaging material exhibits a reversible transition between a colorless state and a colored state; and applying a protective layer over the imaging layer, the protective layer comprising dipolar molecules that can be reversibly switched between a UV light transmission state and a UV light absorption state, wherein the imaging layer is imageable by ultraviolet light when the dipolar molecules are in the UV light transmission state, but the imaging layer is substantially not imageable by ultraviolet light when the dipolar molecules are in the UV light absorption state.

DETAILED DESCRIPTION OF EXEMPLARY EMBODIMENTS

Figure 1A:
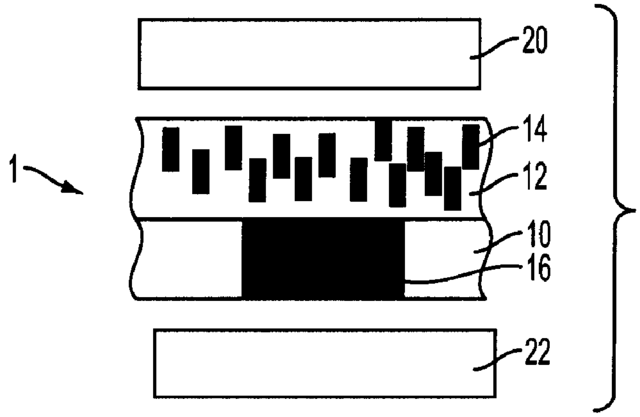
FIGS. 1A-1C are schematic representations of transient documents according to embodiments.

Generally, in various exemplary embodiments, there is provided a reimageable paper or image forming medium formed using a composition that is imageable by UV light, such as comprising a photochromic compound dispersed in a polymer binder, where the composition exhibits a reversible transition between a colored and a clear state. To protect the imaged document against UV light, such as ambient light or sun light, the image forming medium further comprises a protective layer over the imaging layer, the protective layer comprising a dipolar molecule that can be reversibly switched between a UV light transmission state and a UV light absorption state such as by an applied electric field. For example, the protective layer can be switched to a UV light transmission state by applying an electric field that aligns or orients the dipolar molecules parallel to the electric field, such that the writing UV light is not absorbed by the layer. Once writing or imaging of the transient document is complete, the protective layer can be switched to back to the UV light absorption state by turning off the electric field, which returns the dipolar molecules to a random orientation, such that ambient UV light is absorbed by the layer and not transmitted through the layer to cause further image changes. When the user reads the document, the protective layer absorbs UV from ambient light, preventing undesired coloration of unwritten areas, which otherwise will be sensitive to this light. The document is in this way protected against ambient UV light. The ON/OFF cycle with the electric field can be repeated any time when information on the transient document needs to be changed.

By a colored state, in embodiments, refers to for example, the presence of visible wavelengths; likewise, by a colorless state, in embodiments, refers to for example, the complete or substantial absence of visible wavelengths. By "state" in embodiments is a temporary form of the composition, such as a temporary isomeric form of the photochromic or other UV-activated material.

In embodiments, the reimageable paper generally comprises an imaging layer and a protective layer over the imaging layer. The imaging layer and protective layer can be coated on a suitable substrate material, or sandwiched between a first and a second substrate material (i.e., a substrate material and an overcoat layer). Additional layers, such as electrode layers or the like, can also be included.

The imaging layer can include any suitable material that, when exposed to an activating energy such as ultraviolet light, switches such as by isomerization between a first clear state and a second colored state. The color state change can be reversed, and thus the image "erased" and the transient document paper returned to a blank state, by various means such as heating the composition to a temperature that reverses the isomerization reaction, thus returning the photochromic material to its clear state. In the colored state, the image can remain visible for a period of two days or more, providing increased usefulness of the reimageable document.

In embodiments, any suitable composition can be used for forming the imaging layer. For example, photochromic materials such as spiropyrans are known in the art, and described in various of the above-referenced related applications. However, the imaging composition is not limited to these photochromic materials, but can instead include other materials that exhibit the desired state change, such as UV-activated dyes, UV-activated acids and bases, UV-activated imines or amines, UV-activated functionalized fulgicides and dithienylethenes, UV-activated ionomeric compounds, and the like, including combinations thereof. The active imaging material can be dispersed in any suitable medium for forming the imaging layer, such as being dispersed in a solvent, a solution, a polymer binder, or the like; being chemically bonded to a carrier such as a polymer binder; provided in the form of microencapsulated materials; incorporated in an enclosed matrix to hold the imaging composition in place; and the like.

For ease of description, an embodiment will now be described where the imaging composition comprises a photochromic material dispersed in a polymer binder. However, it is understood that the disclosure is not limited thereto.

The photochromic material may exhibit photochromism, which is a reversible transformation of a chemical species induced in one or both directions by absorption of an electromagnetic radiation between two forms having different absorption spectra. The first form is thermodynamically stable and may be induced by absorption of light such as ultraviolet light to convert to a second form. The reverse reaction from the second form to the first form may occur, for example, thermally, or by absorption of light. Various exemplary embodiments of the photochromic material may also encompass the reversible transformation of the chemical species among three or more forms in the event it is possible that reversible transformation occurs among more than two forms. The photochromic material of embodiments may be composed of one, two, three, four, or more different types of photochromic materials, each of which has reversibly interconvertible forms. As used herein, the term "photochromic material" refers to all molecules of a specific species of the photochromic material, regardless of their temporary isomeric forms. For example, where the photochromic material is the species spiropyran, which exhibits isomeric forms as spiropyran and merocyanine, at any given moment the molecules of the photochromic material may be entirely spiropyran, entirely merocyanine, or a mixture of spiropyran and merocyanine. In various exemplary embodiments, for each type of photochromic material, one form may be colorless or weakly colored and the other form may be differently colored.

The photochromic material may be any suitable photochromic material that is useful in providing transient documents including, for example, organic photochromic materials. Examples of photochromic materials include spiropyrans and related compounds like spirooxazines and thiospiropyrans, benzo and naphthopyrans (chromenes), stilbene, azobenzenes, bisimidazols, spirodihydroindolizines, quinines, perimidinespirocyclohexadienones, viologens, fulgides, fulgimides, diarylethenes, hydrazines, anils, aryl disulfides, aryl thiosulfonates and the like. In the aryl disulfides aryl thiosulfonates, suitable aryl groups include phenyl, naphthyl, phenanthrene, anthracene, substituted groups thereof, and the like. These materials can variously undergo heterocyclic cleavage, such as spiropyrans and related compounds; undergo homocyclic cleavage such as hydrazine and aryl disulfide compounds; undergo cis-trans isomerization such as azo compounds, stilbene compounds and the like; undergo proton or group transfer phototautomerism such as photochromic quinines; undergo photochromism via electro transfer such as viologens and the like. Specific examples of materials include:

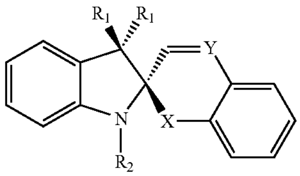

Spiropyran (X = O; Y = —CH)
Spiooxazine (X = O; Y = N)
Thiospiropyran (X = S; Y = CH)

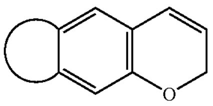

Benzo and Naphtopyran (Chromene)

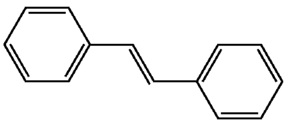

Stilbene

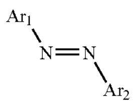

Azobenzene

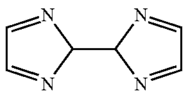

Bisimidazol

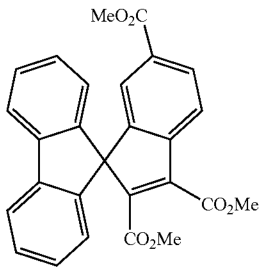

Spirodihydroindolizines

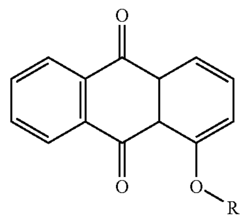

Quinone

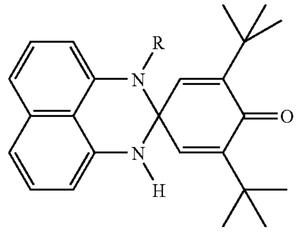

Perimidinespirocyclohexadienones

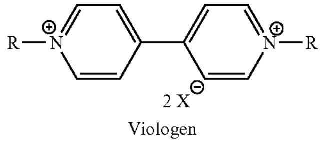

Viologen

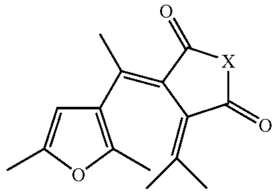

Fulgides (X = O)
Fulgimides (X = NR)

-continued

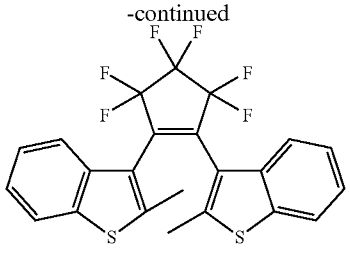

Diarylethenes

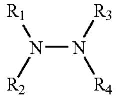

Hydrazines

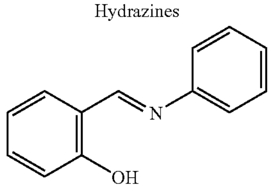

Anil

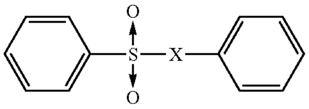

Aryl thiosulfonates

In these structures, the various R groups (i.e., $R_1$, $R_2$, $R_3$, $R_4$) can independently be any suitable group including but not limited to hydrogen; alkyl, such as methyl, ethyl, propyl, butyl, and the like, including cyclic alkyl groups, such as cyclopropyl, cyclohexyl, and the like, and including unsaturated alkyl groups, such as vinyl ($H_2C{=}CH{-}$), allyl ($H_2C{=}CH{-}CH_2{-}$), propynyl ($HC{\equiv}C{-}CH_2{-}$), and the like, where for each of the foregoing, the alkyl group has from 1 to about 50 or more carbon atoms, such as from 1 to about 30 carbon atoms; aryl, including phenyl, naphthyl, phenanthrene, anthracene, substituted groups thereof, and the like, and having from about 6 to about 30 carbon atoms such as from about 6 to about 20 carbon atoms; arylalkyl; such as having from about 7 to about 50 carbon atoms such as from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, such as having from 1 to about 50 carbon atoms such as from 1 to about 30 carbon atoms; aryloxy groups, such as having from about 6 to about 30 carbon atoms such as from about 6 to about 20 carbon atoms; alkylthio groups, such as having from 1 to about 50 carbon atoms such as from 1 to about 30 carbon atoms; arylthio groups, such as having from about 6 to about 30 carbon atoms such as from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, such as having from 1 to about 20 carbon atoms such as from 1 to about 10 carbon atoms; aryloxy groups, such as having from about 6 to about 20 carbon atoms such as from about 6 to about 10 carbon atoms; alkylthio groups, such as having from 1 to about 20 carbon atoms such as from 1 to about 10 carbon atoms; arylthio groups, such as having from about 6 to about 20 carbon atoms such as from about 6 to about 10 carbon atoms; aldehyde groups; ketone groups; ester groups; amide groups; carboxylic acid groups; sulfonic acid groups; and the like. $Ar_1$ and $Ar_2$ can independently be any suitable aryl or aryl-containing group including but not limited to phenyl, naphthyl, phenanthrene, anthracene, and the like, and substituted groups thereof including any of the substitutions mentioned above for the alkyl, aryl, and arylalkyl groups. X in the spiropyran formula is a suitable heteroatom such as N, O, S, and the like. Y can be —N— or —CH—. $X^-$ in the Viologen formula can be, for example, $F^-$, $Cl^-$, $Br^-$, $I^-$, $BF_4^-$, $PF_6^-$, $B(C_6H_5)_4^-$ and the like. $X^-$ in the aryl thiosulfonate can be, for example, —O—, S, —NH— and the like.

Particularly suitable in some embodiments are the spiropyrans and related compounds, although any photochromic material may be used as long as the material provides the desired color contrast properties. For example, spiropyran is suitable because it reversibly isomerizes between a colorless state (spiropyran, SP) to a colored state (merocyanine, MC) under illumination with UV light or application of heat. For this compound, the spiropyran (SP) has low polarity, while merocyanine (MC) has high polarity, due to its dipolar nature. For example, for compound 1 below, the compound reversibly isomerizes between the SP-1 and MC-1 forms as shown below:

Compound 1

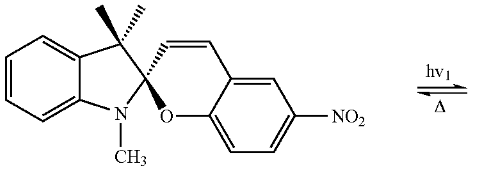

Spiropyran (SP-1)
Colorless

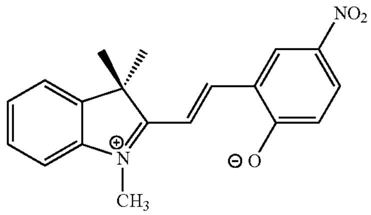

Merocyanine (MC-1)
Colored

That is, upon application of energy such as ultraviolet light, the material converts from a colorless spiropyran (SP-1) with a small dipole moment of about 5 D to a colored, highly conjugated structure of merocyanine (MC-1) with a larger dipole moment of about 11 D (where the unit D (Debye) is 1 D=$3.33\times10^{-30}$ C·m). In the reverse isomerization reaction, upon application of energy such as heat, the material isomerizes from the colored merocyanine (MC-1) to the colorless spiropyran (SP-1).

The photochromic material may be dispersed in any suitable carrier, such as solvent, polymer binder, or the like. Suitable solvents include, for example, straight chain aliphatic hydrocarbons, branched chain aliphatic hydrocarbons, and the like, such as where the straight or branched chain aliphatic hydrocarbons have from about 1 to about 30 carbon atoms. For example, a non-polar liquid of the ISOPAR™ series (manufactured by the Exxon Corporation) may be used as the solvent. These hydrocarbon liquids are considered narrow portions of isoparaffinic hydrocarbon fractions. For example, the boiling range of ISOPAR G™ is from about 157° C. to about 176° C.; ISOPAR H™ is from about 176° C. to about 191° C.; ISOPAR K™ is from about 177° C. to about 197° C.; ISOPAR L™ is from about 188° C. to about 206° C.; ISOPAR M™ is from about 207° C. to about 254° C.; and ISOPAR V™ is from about 254.4° C. to about 329.4° C. In some embodiments, ISOPAR M™ is also a suitable solvent for the photochromic material. Other suitable solvent materials include, for example, the NORPAR™ series of liquids, which are compositions of n-paraffins available from Exxon Corporation, the SOLTROL™ series of liquids available from the Phillips Petroleum Company, and the SHELLSOL™ series of liquids available from the Shell Oil Company. Mixtures of one or more solvents, i.e., a solvent system, can also be used, if desired. In addition, more polar solvents can also be used, if desired. Examples of more polar solvents that may be used include halogenated and nonhalogenated solvents, such as tetrahydrofuran, trichloro- and tetrachloroethane, dichloromethane, chloroform, monochlorobenzene, toluene, xylenes, acetone, methanol, ethanol, xylenes, benzene, ethyl acetate, dimethylformamide, cyclohexanone, N-methyl acetamide and the like. The solvent may be composed of one, two, three or more different solvents. When two or more different solvents are present, each solvent may be present in an equal or unequal amount by weight ranging for example from about 5% to 90%, particularly from about 30% to about 50%, based on the weight of all solvents.

Suitable examples of polymeric binders include, but are not limited to, polyalkylacrylates like polymethyl methacrylate (PMMA), polycarbonates, polyethylenes, oxidized polyethylene, polypropylene, polyisobutylene, polystyrenes, poly (styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid and the like. Copolymer materials such as polystyrene-acrylonitrile, polyethylene-acrylate, vinylidenechloride-vinylchloride, vinylacetate-vinylidene chloride, styrene-alkyd resins are also examples of suitable binder materials. The copolymers may be block, random, or alternating copolymers. In some embodiments, polymethyl methacrylate or a polystyrene is the polymer binder, in terms of their cost and wide availability.

In general, the imaging composition can include the carrier and imaging material in any suitable amounts, such as from about 5 to about 99.5 percent by weight carrier, such as from about 30 to about 70 percent by weight carrier, and from about 0.05 to about 50 percent by weight imaging material, such as from about 0.1 to about 5 percent imaging material by weight. In examples of compositions using a solvent, the solvent or solvent system may be present in any desired amount, such as from about 5 to about 95 percent by weight of the total solvent mixture, such as from about 30 to about 70 percent by weight. Likewise, the photochromic material or mixture of photochromic materials may be present in any desired amount, such as from about 0.05 to about 50 percent by weight of the total solvent mixture, such as from about 0.1 to about 5 percent by weight. Likewise, in examples of compositions using a polymer binder, the polymer binder may be present in any desired amount, such as from about 5 to about 99.5 percent by weight of the total composition, such as from about 50 to about 99 percent by weight. Likewise, the photochromic material or mixture of photochromic materials may be present in any desired amount, such as from about 0.05 to about 20 percent by weight of the total solvent mixture, such as from about 0.5 to about 5 percent by weight.

Suitable selection of polymer binder, solvent, and the like and imaging material such as photochromic material can be readily conducted. For example, suitable selection of the materials can be made by routine testing, measurement, and/or prediction of the relative compatibility of the colorless and colored forms of a particular photochromic material in a particular polymer binder, solvent, and the like or mixture thereof.

In the imaging layer composition of embodiments, the photochromic material is converted from the colorless to the colored state by the application of suitable energy, such as the application of ultraviolet light. The document may then be erased by heating or by illumination with visible light of an appropriate wavelength. An advantage of embodiments, however, is that the photochromic material does not revert to the colorless state at room temperature or under normal ambient light, because of the protecting effect provided by the protective layer. As a result, the colored form of the photochromic material, and thus the visible image, remains stable and visible for up to two days or more.

The imaging layer is overcoated by a protective layer, which protects the imaged document against UV light, such as ambient light or sun light. The protective layer generally comprises a dipolar molecule that can be reversibly switched between a UV light transmission state and a UV light absorption state such as by an applied electric field. The overcoating layer can also include, as with the imaging layer, a suitable solvent, polymer, encapsulations, or the like, for holding the dipolar molecules in place. Alternatively, the dipolar molecules can be provided alone or in combination with such a solvent, polymer binder, encapsulations, or the like, and be sealed in place by a further overcoating layer, matrix system, or the like. The protective layer thus protects the transient document against undesired image degradation due to ambient UV light. As such, the protective layer in embodiments is optically clear and transparent in both states with the electric field ON or OFF, so that an image can be written on the underlying imaging layer when the electric field is ON, and the formed image can be viewed through the protective layer when the electric field is OFF.

In embodiments, any suitable dipolar molecules can be used in the protective layer. Suitably, the dipolar molecule is selected such that when the dipolar molecule is in random orientation, it absorbs in the same or substantially the same spectral region as the imaging material selected, to prevent coloration of the transient document. For most imaging materials, such as photochromic materials, this absorption region is generally between about 400 to about 250 nm. In this case, the dipolar molecule is colorless, and the protected transient document shows white/dark colored images or text.

In some cases, the imaging material has enough absorption in the region beyond about 400 nm, such as between about 400 to about 450 nm. In this case, the protective dipolar molecule has an absorption in this region and may have a yellow appearance when seen in its random state. The reimageable document in this embodiment thus shows images yellow/dark color. This does not affect the contrast too much, since both blank and written states will have decreased reflectance. In this embodiment as well, the white becomes yellow in appearance and the dark becomes darker in appearance due to additional absorption by the yellow dipolar molecule. This embodiment still allows transmission of all the remaining visible light, i.e. the dark state can be viewed.

Typical examples of dipolar molecules suitable for use in embodiments contain an electron donor and an electron acceptor group, connected by a conjugated path. Generally, the length of the conjugation path and the donor and acceptor groups are selected in such a way that they cover the absorption spectrum of the imaging material, in its colorless state. The structure of the dipolar molecules may thus have the general structure Donor—Conjugated Path—Acceptor. The electron donor may be an atom or a group of atoms that have a negative Hammett parameter. The electron acceptor may be a group of atoms having a positive Hammett parameter.

The donor group may be selected from a group including N, O, S, and P, where the valence of the atom is satisfied by bonding to at least one other moiety to satisfy the valence of the atom; the other moiety or moieties to satisfy the valence of the atom selected as the electron donor moiety may be for instance a hydrogen atom or a short hydrocarbon group, such as a straight alkyl chain having for example 1 to about 3 carbon atoms.

The conjugated bridging moiety may be any suitable group through which electrons can pass from the electron donor moiety (D) to the electron acceptor moiety (A). In embodiments, the conjugated bridging moiety (C) may be a n-electron conjugated bridge that is composed of, for example: (a) at least one aromatic ring such as one, two or more aromatic rings having for instance from about 6 carbon atoms to about 40 carbon atoms such as $—C_6H_4—$, and $—C_6H_4—C_6H_4—$; (b) at least one aromatic ring such as one, two or more aromatic rings conjugated through one or more ethenyl or ethynyl bonds having for instance from about 8 carbon atoms to about 50 carbon atoms such as $—C_6H_4—CH{=}CH—C_6H_4—$, and $—C_6H_4—C—C—C_6H_4—$; and (c) fused aromatic rings having for instance from about 10 to about 50 carbon atoms such as 1,4-$C_{10}H_6$ and 1,5-$C_{10}H_6$.

The electron acceptor moiety (A) may be any suitable atom or group capable of accepting electrons. In embodiments, the electron acceptor moiety (A) may be an electron withdrawing functional moiety which possesses a positive Hammett constant. The electron acceptor moiety may be, for example, one of the following: (a) an aldehyde (—CO—H); (b) a ketone (—CO—R) where R may be for example a straight chain alkyl group having for example 1 to about 3 carbon atoms, such as methyl, ethyl, propyl and isopropyl; (c) an ester (—COOR) where R may be for example a straight chain alkyl group having for example 1 to about 3 carbon atoms, such as methyl, ethyl, propyl and isopropyl; (d) a carboxylic acid (—COOH); (e) cyano (—CN); (f) nitro ($—NO_2$); (g) nitroso (—N═O); (h) a sulfur-based group (e.g., $—SO_2—CH_3$; and $—SO_2—CF_3$); (i) a fluorine atom; and (k) a boron atom.

For example, suitable examples of the donor and acceptor groups include $—NO_2$, —CN, —CH═O, $—CH_3$, $—OCH_3$, $—NR_2$, and the like, and suitable examples of the conjugation path groups include -Ph-, -Ph-$C_nH_n$-Ph-, -Ph-$C_nH_{2n-2}$-Ph-, where n can be from 1 to about 10 or more, and the like. Some examples of such molecules include:

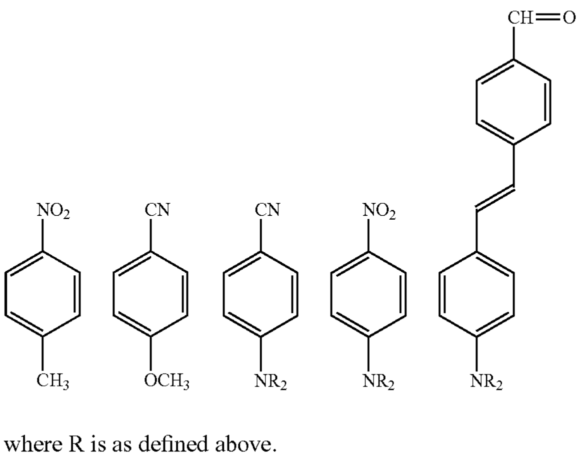

where R is as defined above.

If desired or required, such as for more efficient coverage of the whole region of the spectrum where the imaging material absorbs light, mixtures of two or more dipolar molecules can be used.

For applying the dipolar molecules to the transient document as a protective layer, the dipolar molecules can be applied in any suitable manner. For example, the dipolar molecules can be mixed and applied with any suitable solvent or polymer binder, such as described for use in forming the imaging layer. Further, lower Tg polymers, such as polysiloxanes, can also be used in forming the protective layer. Generally, the polymer binder is suitably selected to be of relatively low glass transition temperature, to allow fast relaxation of the dipolar molecules for efficient protection when the document is read. When a solvent is used, the dipolar molecule can be suitably is dissolved in a suitable solvent, such as an organic solvent. The relaxation of the dipolar molecules to the random state is very fast in this configuration. For flexible protected transient documents, the protective composition may optionally be encapsulated and a film of the encapsulated materials deposited over the imaging layer.

In another embodiment, the dipolar molecule can be dissolved in a nematic liquid crystal, and the composition thereafter applied as the protective layer. Nematic liquid crystals with positive dielectric anisotropy are composed of a hard core made of a polyaromatic ring and a flexible moiety composed of a hydrocarbon group. In embodiments, the nematic liquid crystals suitable for the purposes of this invention are composed of a hard core made of two or more monocyclic aromatic groups and a flexible moiety made of an alkyl group of variable length such as from 1 to about 5, to about 10, to about 15, or to about 20 carbon atoms, which may be optionally substituted. Most often, commercially available nematic liquid crystals are mixtures of nematic molecules.

Many suitable nematic liquid crystals are mixtures of alkyl-biphenylnitrile or alkyl-terphenylnitrile molecules and are commercially available and would be known to those of ordinary skill in the art in view of this disclosure. Exemplary examples include for example nematic liquid crystal BL mixtures available at EM Industries, Inc., BL001 (E7), BL002 (E8), BL033 (version of BL002) and BL087, and 5CB (commercially available at Sigma-Aldrich). here is provided below a structural formula for nematic liquid crystals compounds that are included in the commercially available E7 and of 5CB:

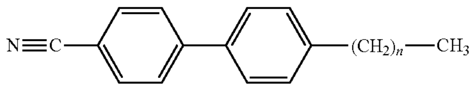

where E7 is a mixture of compounds where n is 4, 6, and 7, and 5CB is a single compound where n is 5. Any other suitable nematic liquid crystal can be used, as desired. In this embodiment, the required switching voltage for the ON or writing state is lower than in the case of using a solvent or a polymer binder.

The transient document may comprise a supporting substrate, coated on at least one side with the imaging layer and the protective layer. As desired, the substrate can be coated on either only one side, or on both sides, with the imaging layer and the protective layer. When the imaging layer and the protective layer are coated on both sides, or when higher visibility of the image is desired, an opaque layer may be included between the supporting substrate and the imaging layer(s) or on the opposite side of the supporting substrate from the coated imaging layer and the protective layer. Thus, for example, if a one-sided transient document is desired, the transient document may include a supporting substrate, coated on one side with the imaging layer and the protective layer and coated on the other side with an opaque layer such as, for example, a white layer. Also, the transient document may include a supporting substrate, coated on one side with the imaging layer and the protective layer and with an opaque layer between the substrate and the imaging layer. If a two-sided transient document is desired, then the transient document may include a supporting substrate, coated on both sides with the imaging layer and the protective layer, and with at least one opaque layer interposed between the two coated imaging layers. Of course, an opaque supporting substrate, such as conventional paper, may be used in place of a separate supporting substrate and opaque layer, if desired.

Any suitable supporting substrate may be used. For example, suitable examples of supporting substrates include, but are not limited to, glass, ceramics, wood, plastics, paper, fabrics, textile products, polymeric films, inorganic substrates such as metals, and the like. The plastic may be for example a plastic film, such as polyethylene film, polyethylene terephthalate, polyethylene naphthalate, polystyrene, polycarbonate, polyethersulfone. The paper may be, for example, plain paper such as XEROX® 4024 paper, ruled notebook paper, bond paper, silica coated papers such as Sharp Company silica coated paper, Jujo paper, and the like. The substrate may be a single layer or multi-layer where each layer is the same or different material. In embodiments, the substrate has a thickness ranging for example from about 0.3 mm to about 5 mm, although smaller or greater thicknesses can be used, if desired.

When an opaque layer is used in the transient document, any suitable material may be used. For example, where a white paper-like appearance is desired, the opaque layer may be formed from a thin coating of titanium dioxide, or other suitable material like zinc oxide, inorganic carbonates, and the like. The opaque layer can have a thickness of, for example, from about 0.01 mm to about 10 mm, such as about 0.1 mm to about 5 mm, although other thicknesses can be used.

If desired, a further overcoating layer may also be applied over the applied imaging layer and protective layer. The further overcoating layer may, for example, be applied to further adhere the underlying layers in place over the substrate, to provide wear resistance, to improve appearance and feel, and the like. The overcoating layer can be the same as or different from the substrate material, although in embodiments at least one of the overcoating layer and substrate layer is clear and transparent to permit visualization of the formed image. The overcoating layer can have a thickness of, for example, from about 0.01 mm to about 10 mm, such as about 0.1 mm to about 5 mm, although other thicknesses can be used.

In embodiments where the imaging material is coated on the substrate, the coating can be conducted by any suitable method available in the art, and the coating method is not particularly limited. For example, the imaging material can be coated on the substrate by dip coating the substrate into a solution of the imaging material composition followed by any necessary drying, or the substrate can be coated with the imaging composition to form a layer thereof. Similarly, the protective coating can be applied by similar methods.

To align or orient the dipolar molecules to permit writing on the transient document, an electric field is applied to the protective layer. In embodiments, the electric field can be applied entirely external to the transient document, or it may be applied using one or more layers that are part of the transient document. These alternatives are shown schematically in FIGS. 1A-1C. In the Figures, the transient document 1 includes an imaging layer 10, shown as having an imaged portion 16. Over the imaging layer 10 is coated a protective layer 12 including dipolar molecules 14. For ease of depiction, a substrate is not shown; however, it could be included beneath the depicted imaging layer 10.

In a first embodiment, shown in FIG. 1A, the electric field can be applied entirely external to the transient document. Thus, for example, the transient document 1 could be placed between positive electrode 20 and negative electrode 22, to create a desired electric field.

Figure 1B:
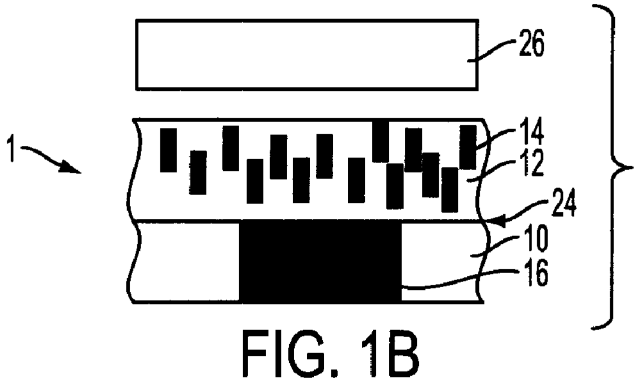

Alternatively, as shown in FIG. 1B, a ground plane can be included within the transient paper itself. Thus, for example, the protective layer 12 can be grounded, such as by a ground plane 24 located beneath the protective layer 12, and a top positive or negative electrode 26 is used to apply a voltage. In this embodiment, for example, the substrate bearing the imaging layer may be a metallized paper where the metallization provides the ground plane.

Figure 1C:
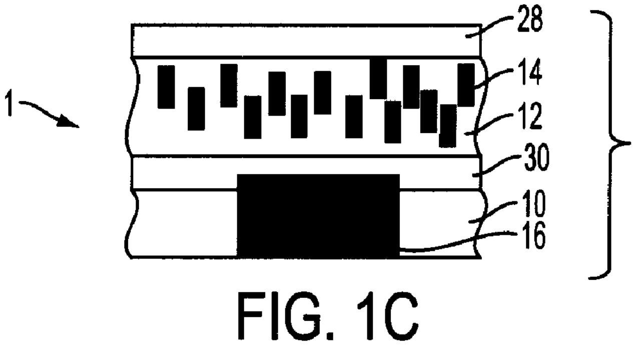

A further embodiment, shown in FIG. 1C, incorporates the electrodes directly into the transient document. Thus, for example, the transient document 1 can include positive and negative electrodes 28,20, which can be included in either order. In this embodiment, the voltage can be applied through the included electrodes from an external source (not shown). This configuration allows the use of a lower electric field in the process of writing. However, because at least the top electrode generally should be made of transparent plastic, the device may have a plastic feeling rather than a paper feeling.

Figure 2A:
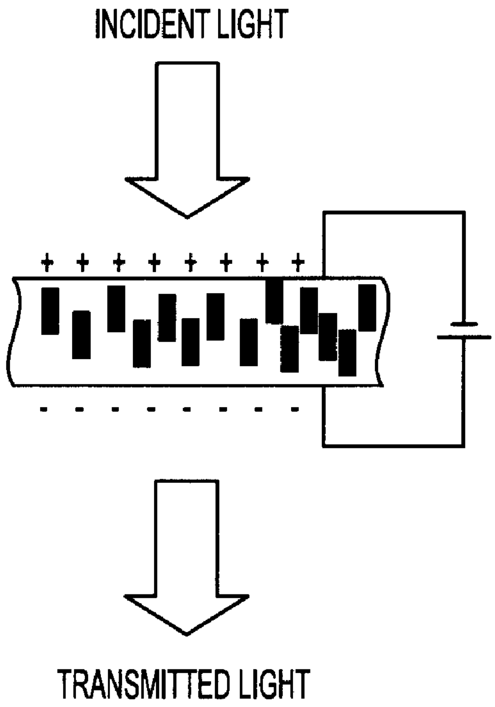
FIGS. 2A-2B are schematic representations showing the transmission and absorption of UV light according to embodiments.
Figure 2B:
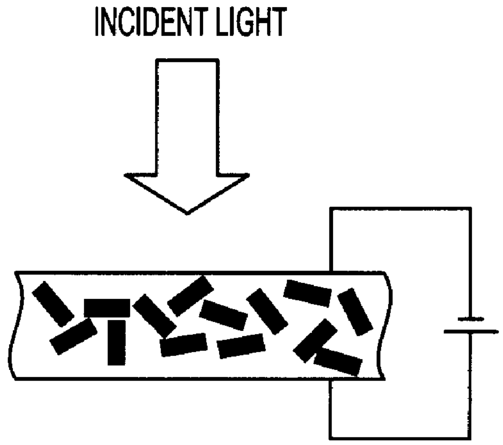

In its method aspects, the present disclosure involves providing a reimageable medium composed of a substrate and an imaging layer comprising an imaging material such as a photochromic material, overcoated with a protective layer comprising a dipolar molecule that can be reversibly switched between a UV light transmission state and a UV light absorption state such as by an applied electric field. As shown in FIG. 2, the protective layer switches between two states relative to transmission of UV light. Switching is achieved with electric field. In the ON state (electric field is on), shown in FIG. 2A, the layer is transparent to UV light. In the OFF state (electric field is removed), shown in FIG. 2B, the protective layer absorbs UV light. Because the dipolar molecules possess a permanent dipole moment, they align parallel to an applied electric field. When the electric field is removed, the dipolar molecules will quickly reorient randomly in the protective layer. As a result, they will absorb all the incident light and thus protect the imaging layer from image degradation.

In a writing process, the transient document is exposed to an applied electric field to align the dipolar molecules so as to permit transmission of the writing UV light through the protective layer. In this state, the dipolar molecules do not interact with incident UV light, and the protective film is transparent for this UV writing light. While the electric field is ON, the reimageable medium is exposed to an imaging light corresponding to a predetermined image to result in an exposed region and a non-exposed region, wherein the color contrast is present between the exposed region and the non-exposed region to allow a temporary image corresponding to the predetermined image to be visible to the naked eye.

The imaging light used to form the transient image may have any suitable predetermined wavelength scope such as, for example, a single wavelength or a band of wavelengths. In various exemplary embodiments, the imaging light is an ultraviolet (UV) light having a single wavelength or a narrow band of wavelengths selected from the UV light wavelength range of about 200 nm to about 475 nm, such as a single wavelength at about 365 nm or a wavelength band of from about 360 nm to about 370 nm. For forming the image, the reimageable medium may be exposed to the imaging light for a time period ranging from about 10 milliseconds to about 5 minutes, particularly from about 30 milliseconds to about 1 minute. The imaging light may have an intensity ranging from about 0.1 $mW/cm^2$ to about 100 $mW/cm^2$, particularly from about 0.5 $mW/cm^2$ to about 10 $mW/cm^2$.

In various exemplary embodiments, imaging light corresponding to the predetermined image may be generated for example by a computer or a Light Emitting Diode (LED) array screen and the temporary image is formed on the reimageable medium by placing the medium on or in proximity to the LED screen for the desired period of time. In other exemplary embodiments, a UV Raster Output Scanner (ROS) may be used to generate the UV light in an image-wise pattern. Other suitable imaging techniques that can be used include, but are not limited to, irradiating a UV light onto the image forming medium through a mask, irradiating a pinpoint UV light source onto the image forming medium in an imagewise manner such as by use of a light pen, and the like.

Once the writing process is complete, the electric field applied to the transient document is turned OFF, causing the dipolar molecules to return to their random orientation. In this state, the dipolar molecules absorb incident light in the protected range, i.e. the absorption spectrum of the dipolar molecule, and thus prevent UV light transmission through the protective layer to the imaging layer. Because the incident light is absorbed in the protective layer, it does not cause degradation, such as coloration and loss of image contrast, of the image written on the imaging layer.

To erase the image from the transient document in one embodiment, the transient document bearing the image may be subjected to an ambient condition for an image erasing time in order to change the color contrast to the absence of color contrast. Thus, the image can, in embodiments, be erased without using an image erasure device or technique, and the image is visible only for a period of time sufficient for a user to view the image, but the period of time is also limited in order to allow the user to repeat the procedures of image formation and image erasure a number of times. As such, the medium may undergo a number of cycles of image formation and image erasure. For example, the medium may undergo image formation and image erasure of from about 2 to about 100 or about 500 or more times, such as from about 2 or about 5 or about 10 to about 40 or about 50 or more times. Accordingly, the re-imageable medium may be considered "self-erasing." However, because the colored form of the photochromic material is stable in embodiments, this self-erasure under ambient conditions may take as long as two days to two weeks or more.

In other embodiments, where faster erasure is desired so that a new image can be formed, erasure may be conducted by heating the transient document to an elevated temperature. For example, heating can be conducted at a temperature of from about 50 to about 500° C., such as from about 70 to about 200° C., to enable erasure of the image.

As a further alternative, the transient document may be exposed to erasing irradiation or an erasing device. Where erasing irradiation is used, the irradiation can be conducted either with or without an applied electric field, depending upon whether the random oriented dipolar molecules would transmit or absorb the erasing irradiation.

According to various exemplary implementations, the color contrast that renders the image visible to an observer may be a contrast between, for example two, three or more different colors. The term "color" may encompass a number of aspects such as hue, lightness and saturation, where one color may be different from another color if the two colors differ in at least one aspect. For example, two colors having the same hue and saturation but are different in lightness would be considered different colors. Any suitable colors such as, for example, red, white, black, gray, yellow, cyan, magenta, blue, and purple, can be used to produce a color contrast as long as the image is visible to the naked eye of a user. In various exemplary embodiments, the following exemplary color contrasts may be used: purple temporary image on a white background; yellow temporary image on a white background; dark purple temporary image on a light purple background; and light purple temporary image on a dark purple background. However, in terms of desired maximum color contrast, a desirable color contrast is a dark gray or black image on a light or white background, such as a gray, dark gray, or black image on a white background, or a gray, dark gray, or black image on a light gray background.

In various exemplary embodiments, the color contrast may change such as, for example, diminish during the visible time, but the phrase "color contrast" may encompass any degree of color contrast sufficient to render an image discernable to a user regardless of whether the color contrast changes or is constant during the visible time.

In various exemplary embodiments, the color contrast of the image on the transient document may be maintained for a period of time of, for example, at least about one day or more, at least about two days or more, or at least about four days or more, and for up to about four days, about one, about two, about three, or about four weeks, or more. For example, in order to enable its use as long-term electronic paper, the color contrast of the temporary image on the transient document in embodiments may be maintained for a period of time of at least about two days or at least about four days to about one or about two weeks, or for at least about one week or at least about two weeks to at least about three weeks or at least about four weeks.

This longer term visibility of the image may be provided by the protective layer. That is, because the protective layer absorbs incident UV light, the incident UV light does not cause undesired darkening of non-imaged areas and resultant loss of contrast.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

A reusable document is made by coating a photochromic imaging composition followed by a protective layer on a paper substrate. The photochromic sheet was made by coating a sheet of paper by doctor blade procedure with a solution containing 50 mg of 1',3'-dihydro-8-methoxy-1',3',3'-trimethyl-6-nitrospiro[2H-1-benzopyran-2,2'-2H-indole] (SP8M) dissolved in 2.5 ml solution containing 0.625 g of polymethylmethacrylate (PMMA) as a polymer binder. The photochromic layer is then dried. In a similar manner, a photochromic composition film was applied to a glass slide, in order to allow UV-VIS spectra measurements.

Separately, a liquid crystal call was made for use as a top protective layer. The cell was made by filling a liquid crystal cell with a composition containing a nematic liquid crystal (BL087; 497 mg) doped with 1.4 mg of a dipolar molecule, N,N-dimethyl-4-nitroaniline. The cell was prepared by using standard LCD fabrication procedures. The reimageable document is formed by placing the liquid crystal cell on top of the photochromic composition treated paper or glass slide.

The sheet of paper containing photochromic material, prepared above, was initially in a white state, not having been exposed to UV light. The paper was covered with the liquid crystal cell in its OFF or protective state. The transient document was then exposed to outdoor sunlight for several minutes. This experiment simulates protection of blank areas of a transient document when read under sunlight conditions. The photochromic material was chosen for this demonstration because it is very sensitive to coloration under outdoor light. As a result, the unprotected areas (not covered by the liquid crystal cell) became dark blue colored, while the protected areas (covered by the liquid crystal cell) had little, if any, blue coloration.

Figure 3:
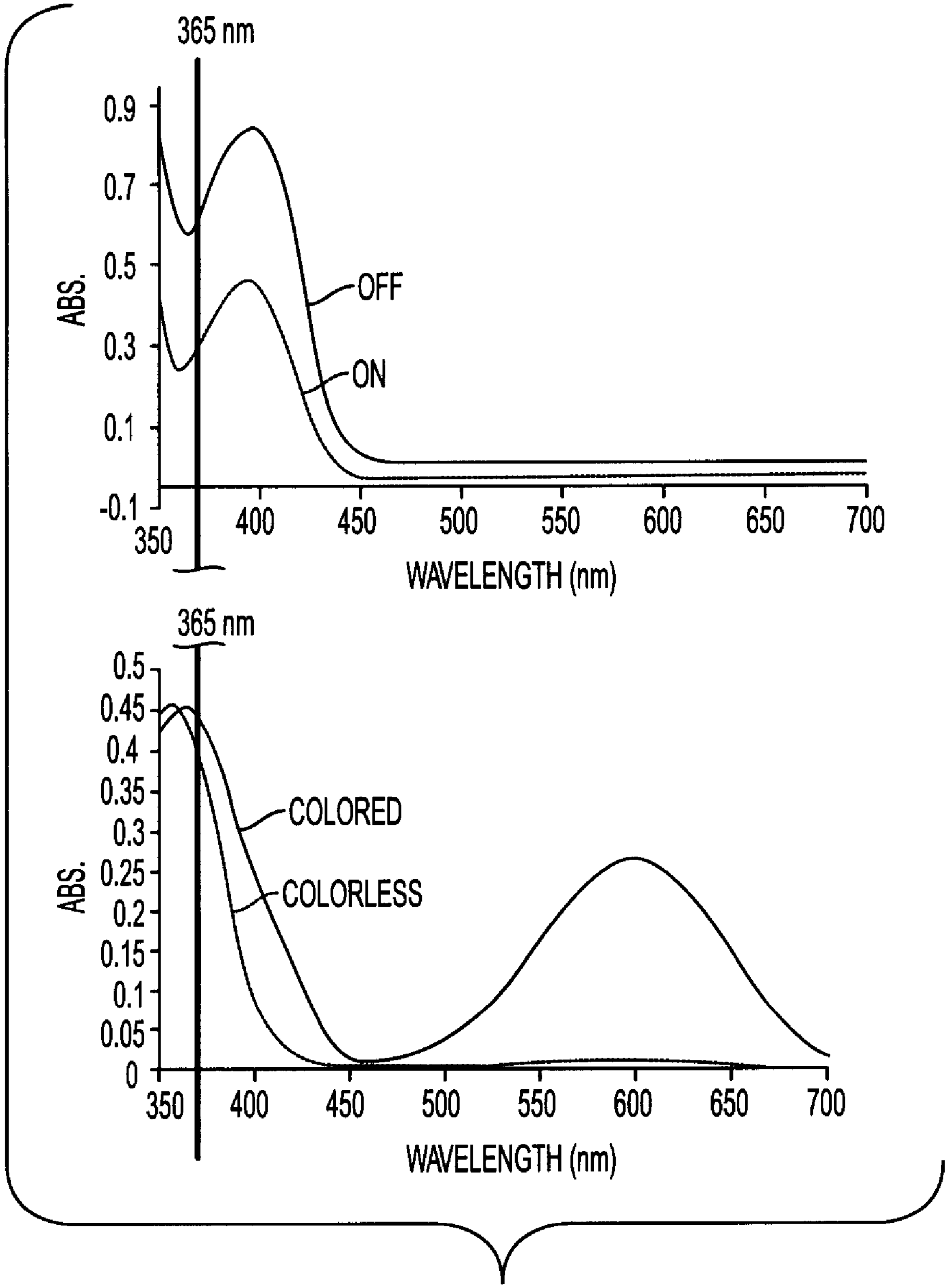
FIG. 3 shows UV-VIS spectra measurements for an embodiment.

The glass slide containing photochromic material, prepared above, was also initially in a clear state, not having been exposed to UV light. The glass slide was covered with the liquid crystal cell in its OFF or protective state. The liquid crystal cell was switched between the ON and OFF states, and UV-VIS spectra measurements were taken. As shown in FIG. 3, the top graph shows the absorption of the liquid crystal cell containing the dipolar molecules N,N-dimethyl-4-nitroaniline when the liquid crystal cell is in the OFF (protective) and ON (transmissive) states. The indicated 365 nm line is the writing UV light wavelength in this Example. The bottom graph in FIG. 3 shows the absorption of the spiropyran photochromic film when the liquid crystal cell is in the OFF (protective) and ON (transmissive) states. The two spectra graphs show that the dye from the liquid crystal cell has excellent absorption overlapping with the UV absorption of the spiropyran molecule in its transparent state. As a result, when the photochromic layer is in its colorless state, it is very well protected against UV component from UV light because UV is absorbed by top liquid crystal/dye layer. This process does not affect the self-erasing of the transient document, i.e., self-erasing as the photochromic material slowly over time converts from its colored state back to its colorless state. The fading can take days, weeks or months to complete.

Next, the paper transient document with the liquid crystal cell is written using UV light. In particular, UV light of 365 nm of high intensity was used to write on the transient documents. When the photochromic paper sheet was illuminated through the liquid crystal cell in the ON state, an optical density (OD) was measured as 0.80 for colored state. When it was directly illuminated with no liquid crystal protective layer, the obtained OD was 1.03. This demonstrates that the coloration (writing) can be achieved at a reasonable level, when compared with unprotected sample.

Example 2

A second liquid crystal call was made for use as a top protective layer. The cell was made by filling a liquid crystal cell with a composition containing a nematic liquid crystal (BL087; 497 mg) doped with 1.4 mg of a dipolar molecule, N,N-dimethyl-4-nitroaniline. The cell was made by filling a liquid crystal cell with a composition containing a nematic liquid crystal BL087 (497 mg) and a dipolar dye (D2 available from BDH; 5 mg). The cell was prepared by using standard LCD fabrication procedures. A transient document was formed by placing the liquid crystal cell on top of the photochromic composition treated glass slide prepared in Example 1.

Figure 4:
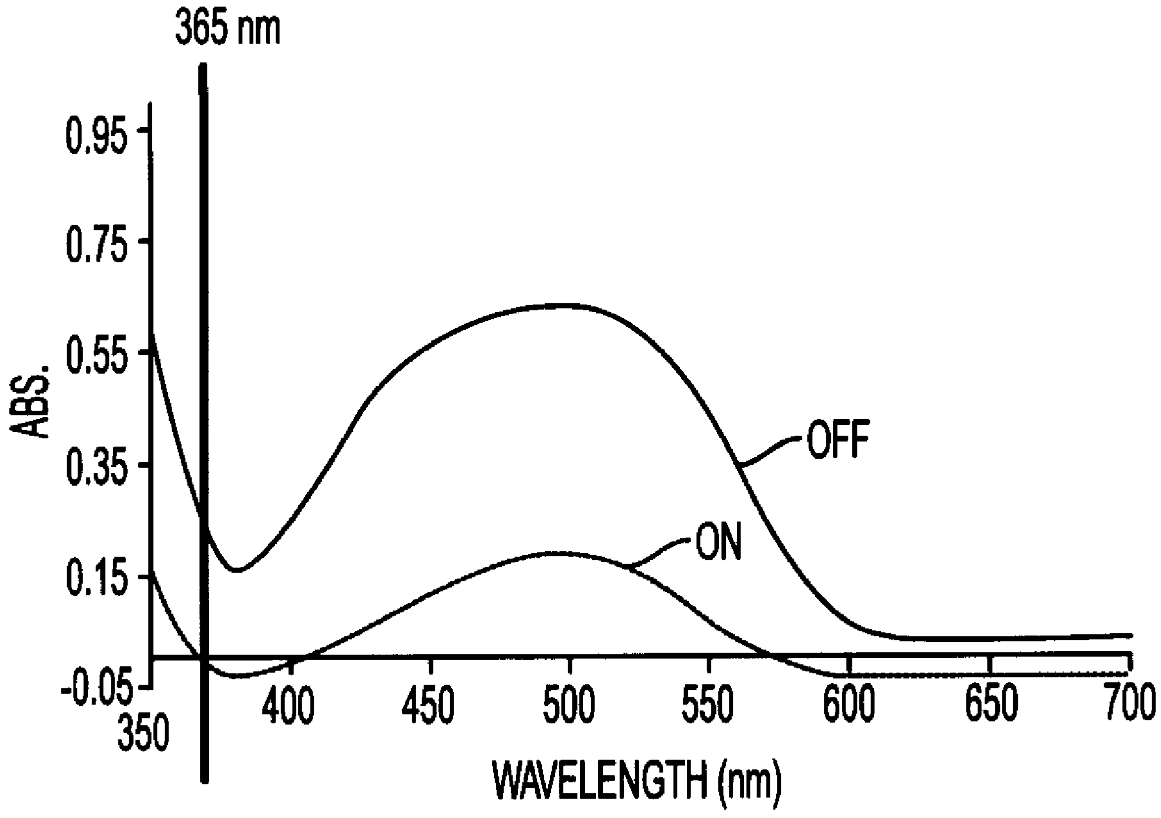
FIG. 4 shows UV-VIS spectra measurements for another embodiment.

The glass slide containing photochromic material was also initially in a clear state, not having been exposed to UV light. The glass slide was covered with the liquid crystal cell in its OFF or protective state. The liquid crystal cell was switched between the ON and OFF states, and UV-VIS spectra measurements were taken. As shown in FIG. 4, the absorbance of this mixture at 365 nm in the ON state is essentially zero. This allows writing on transient documents at the same level of coloration as with the unprotected document, but will offer the described protection against ambient UV light.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image forming medium, comprising a substrate;

an imaging layer comprising an imaging material coated on said substrate, wherein the imaging material exhibits a reversible transition between a colorless state and a colored state; and a protective layer over the imaging layer, the protective layer comprising dipolar molecules that can be reversibly switched between a UV light transmission state and a UV light absorption state, wherein the dipolar molecules in their random orientation absorb in substantially the same spectral region as the imaging material in its un-imaged state, the imaging layer is imageable by ultraviolet light when the dipolar molecules are in the UV light transmission state, but the imaging layer is substantially not imageable by ultraviolet light when the dipolar molecules are in the UV light absorption state, the dipolar molecules are dispersed in a film-forming medium for forming the protective layer, the film-forming medium is selected from the group consisting of a solvent, a polymer binder, microcapsules, and a matrix material, the dipolar molecules are compounds having an electron donor group and an electron acceptor group, connected by a conjugated path, and the conjugated path is selected from the group consisting of at least one aromatic ring conjugated through one or more ethenyl or ethynyl bonds having from 8 carbon atoms to 50 carbon atoms.

2. The image forming medium of claim 1, wherein the dipolar molecules are oriented in the UV light transmission state by application of an electric field, and the dipolar molecules are oriented in the UV light absorption state by absence of an electric field.

3. The image forming medium of claim 1, wherein:

the electron donor group has a negative Hammett parameter and is a group selected from the group consisting of one or more of N, O, S, and P, bonded to H or a straight alkyl chain having from 1 to 3 carbon atoms; and the electron acceptor group has a positive Hammett parameter and is selected from the group consisting of an aldehyde, a ketone, an ester, a carboxylic acid, cyano, nitro, nitroso, a sulfur-based group, a fluorine atom, and a boron atom.

4. The image forming medium of claim 1, wherein the imaging material comprises a photochromic compound.

5. The image forming medium of claim 1, wherein the photochromic compound is selected from the group consisting of a spiropyran compound, spirooxazine, thiospiropyran, a benzo compound, naphthopyran, stilbene, azobenzene, bisimidazol, spirodihydroindolizine, quinine, perimidinespirocyclohexadienone, viologen, fulgide, fulgimide, diarylethene, hydrazine, anil, aryl disulfide, and aryl thiosulfonate.

6. The image forming medium of claim 1, wherein the imaging material is dispersed in a film-forming medium for forming the imaging layer.

7. The image forming medium of claim 6, wherein the film-forming medium is a polymer binder selected from the group consisting of polyethylene, polypropylene, polyisoprene, polyisobutylene, polymethyl methacrylate, polycarbonates, polystyrenes, poly(styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, polystyrene-acrylonitrile, polyethylene-acrylate, vinylidenechloride-vinylchloride, vinylacetate-vinylidene chloride, styrene-alkyd resins, and mixtures and copolymers thereof.

8. The image forming medium of claim 6, wherein the film-forming medium is a solvent selected from the group consisting of straight chain aliphatic hydrocarbons, branched chain aliphatic hydrocarbons, and mixtures thereof.

9. The image forming medium of claim 1, wherein:

the imaging layer comprises from about 5 to about 99.5 percent by weight of a film forming medium and from about 0.05 to about 50 percent by weight of the imaging material; and the protective layer comprises from about 0.01 to about 50 percent by weight of the dipolar molecules.

10. The image forming medium of claim 1, further comprising a ground plane located between the imaging layer and the protective layer.

11. The image forming medium of claim 1, further comprising a positive electrode layer and a negative electrode layer, wherein one of the positive electrode layer and the negative electrode layer is located over the protective layer, and the other of the positive electrode layer and the negative electrode layer is located beneath the protective layer.

12. The image forming medium of claim 1, wherein the substrate is selected from the group consisting of glass, ceramic, wood, plastic, paper, fabric, textile, metals, plain paper, and coated paper.

13. A method of forming a transient image, comprising:

providing an image forming medium comprising:

a substrate;

an imaging layer comprising an imaging material coated on said substrate, wherein the imaging material exhibits a reversible transition between a colorless state and a colored state; and a protective layer over the imaging layer, the protective layer comprising dipolar molecules that can be reversibly switched between a UV light transmission state and a UV light absorption state, wherein the dipolar molecules in their random orientation absorb in substantially the same spectral region as the imaging material in its un-imaged state, the imaging layer is imageable by ultraviolet light when the dipolar molecules are in the UV light transmission state, but the imaging layer is substantially not imageable by ultraviolet light when the dipolar molecules are in the UV light absorption state, the dipolar molecules are dispersed in a film-forming medium for forming the protective layer, the film-forming medium is selected from the group consisting of a solvent, a polymer binder, microcapsules, and a matrix material, the dipolar molecules are compounds having an electron donor group and an electron acceptor group, connected by a conjugated path, and the conjugated path is selected from the group consisting of at least one aromatic ring conjugated through one or more ethenyl or ethynyl bonds having from 8 carbon atoms to 50 carbon atoms;

applying an electric field across said image forming medium to orient the dipolar molecules in the UV light transmission state;

exposing the image forming medium to a UV light in an imagewise manner; and removing the electric field from across said image forming medium to return the dipolar molecules in the UV light absorption state.

14. The method of claim 13, wherein the exposing is for a time period ranging from about 10 milliseconds to about 5 minutes at an intensity ranging from about 0.1 $mW/cm^2$ to about 100 $mW/cm^2$.

15. A method of making an image forming medium, comprising:

providing a substrate;

applying to the substrate an imaging layer comprising an imaging material, wherein the imaging material exhibits a reversible transition between a colorless state and a colored state; and applying a protective layer over the imaging layer, the protective layer comprising dipolar molecules that can be reversibly switched between a UV light transmission state and a UV light absorption state, wherein the dipolar molecules in their random orientation absorb in substantially the same spectral region as the imaging material in its un-imaged state, the imaging layer is imageable by ultraviolet light when the dipolar molecules are in the UV light transmission state, but the imaging layer is substantially not imageable by ultraviolet light when the dipolar molecules are in the UV light absorption state, the dipolar molecules are dispersed in a film-forming medium for forming the protective layer, the film-forming medium is selected from the group consisting of a solvent, a polymer binder, microcapsules, and a matrix material, the dipolar molecules are compounds having an electron donor group and an electron acceptor group, connected by a conjugated path, and the conjugated path is selected from the group consisting of at least one aromatic ring conjugated through one or more ethenyl or ethynyl bonds having from 8 carbon atoms to 50 carbon atoms.

* * * * *